June 24, 1941.   H. T. KRAFT   2,246,977
PIPE JOINT AND GASKET THEREFOR
Filed Jan. 28, 1938   2 Sheets-Sheet 2
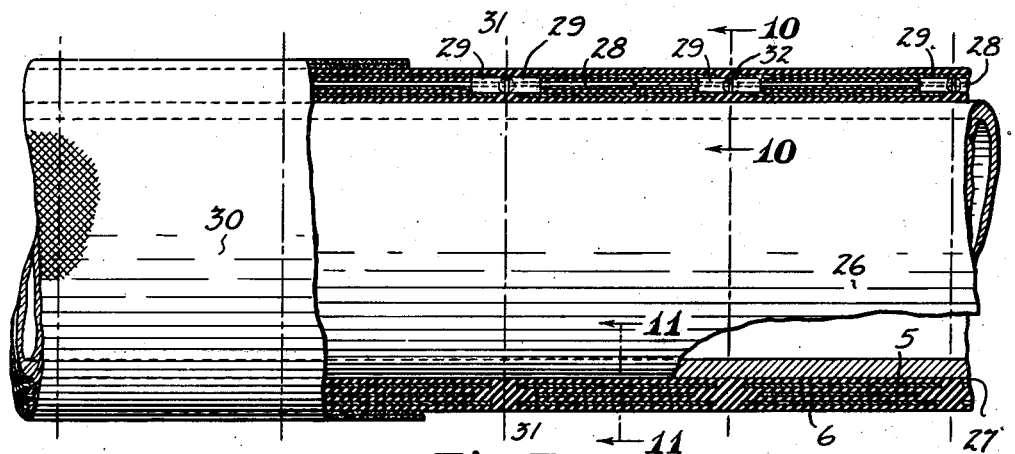
Fig. 8
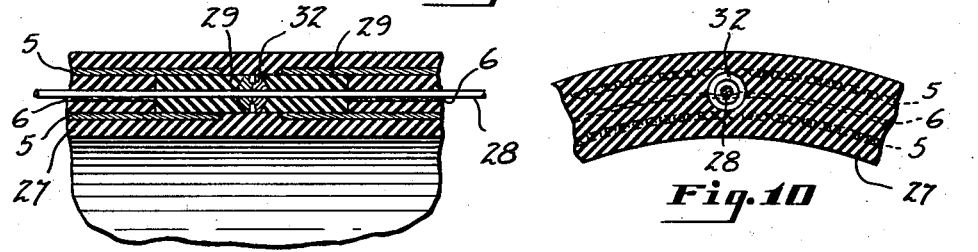
Fig. 9   Fig. 10
Fig. 11
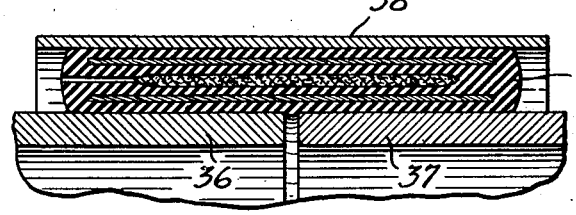
Fig. 12
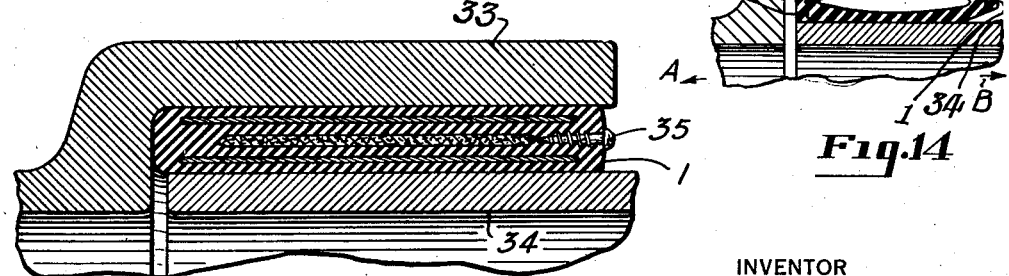
Fig. 13   Fig. 14
INVENTOR
Herman T. Kraft
BY Evans & McCoy
ATTORNEYS Patented June 24, 1941

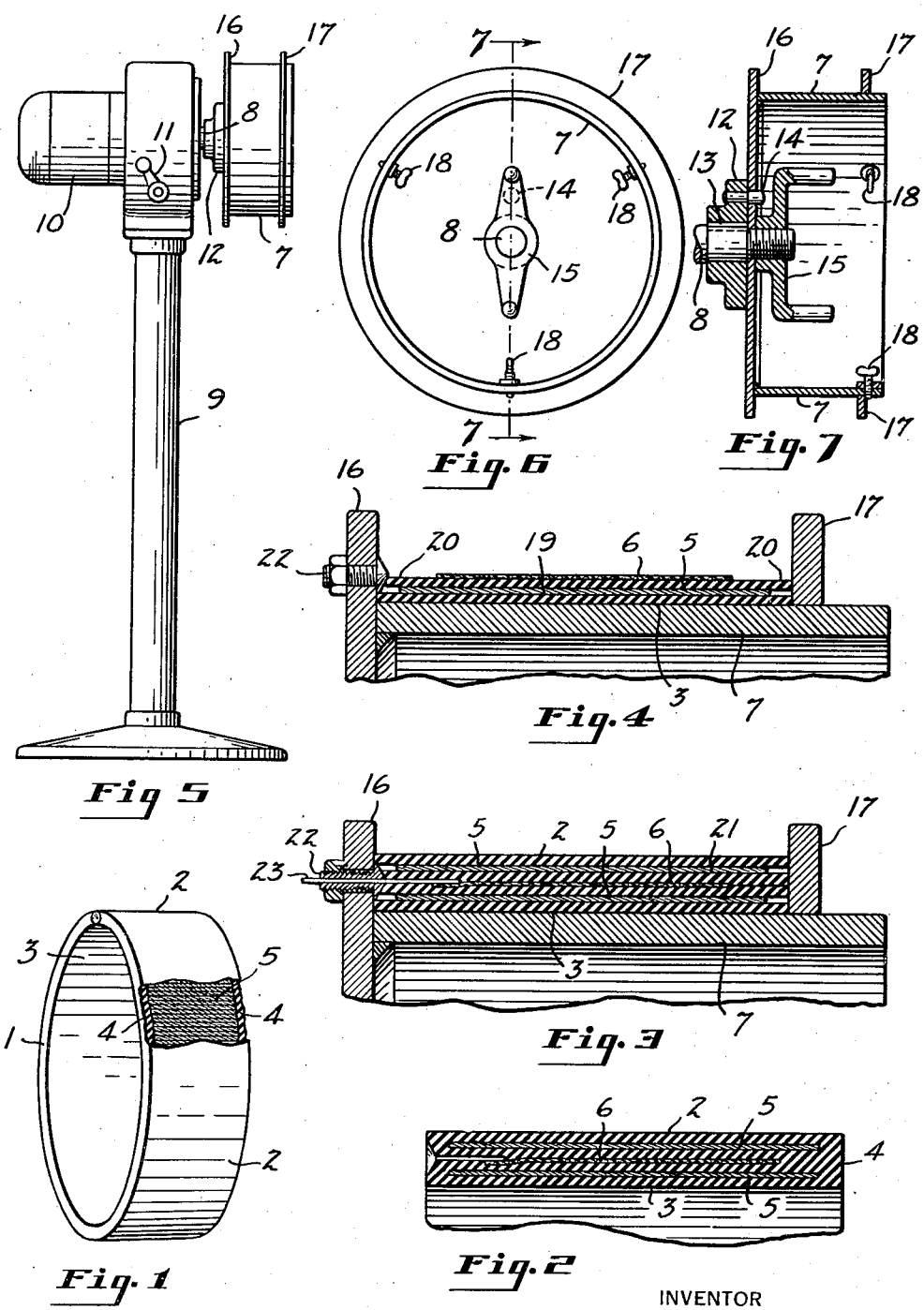

2,246,977

UNITED STATES PATENT OFFICE 2,246,977

PIPE JOINT AND GASKET THEREFOR

Herman T. Kraft, Akron, Ohio, assignor to The General Tire & Rubber Company, Akron, Ohio, a corporation of Ohio Application January 28, 1938, Serial No. 187,421

2 Claims. (Cl. 285—90)

This invention relates to an inflatable sealing gasket for pipe joints and to a method of manufacturing the same, this application being a continuation in part of my co-pending application Serial No. 135,284, filed April 6, 1937.

The present invention has for an object the provision of an inexpensive, resilient, corrosion resistant and inflatable gasket for sealing pipe joints of the sleeve type or of the bell and spigot type which is effective in sealing the joints even though the pipes are out of round or where there is lack of continuity of contact between the surfaces of the pipe ends that are intended to abut.

A further object is to provide an inflatable gasket of a suitable form adapted for insertion into the narrow annular space between pipe ends and an outer sleeve or between bell and spigot pipe ends in a pipe joint.

A further object is to provide an inflatable gasket so constructed that substantially all expansion of the gasket, on inflation, is in a radial direction.

Another object is to provide a simple and economical method of manufacturing inflatable gaskets.

Another object is to provide a pipe gasket that has great resiliency and that is capable of maintaining a fluid-tight seal in pipes which are frequently subjected to mechanical shocks or which by reason of their connection to machinery are subjected to continuous vibration.

With the above and other objects in view, the invention may be said to comprise the gasket that is shown in the accompanying drawings and hereinafter described, the method of making the gasket, together with such variations and modifications thereof as will be apparent to those skilled in the art to which the present invention pertains. Reference should be had to the accompanying drawings that form a part of the present specification, in which:

Figure 1 is a perspective view of a gasket embodying the invention, a portion of the outer wall being broken away to show the reinforcing cords therein;

Fig. 2 is a fragmentary axial section through the gasket on an enlarged scale;

Fig. 3 is a fragmentary axial section showing the gasket on the mandrel upon which the gasket is built;

Fig. 4 is a fragmentary axial section showing a partly built gasket on the mandrel;

Fig. 5 is a side elevation of the mandrel and its driving motor mounted on a suitable standard;

Fig. 6 is a front elevation of the mandrel;

Fig. 7 is an axial section taken on the line indicated at 7—7 in Fig. 6;

Fig. 8 is a side elevation, partly in section, showing a long mandrel on which a plurality of gaskets may be built simultaneously;

Fig. 9 is a fragmentary axial section on an enlarged scale showing the junction of two gaskets formed on the mandrel shown in Fig. 8;

Fig. 10 is a fragmentary section on an enlarged scale taken on the line indicated at 10—10 in Fig. 8, showing a block of rubber of a contrasting color in which the inflation aperture is formed;

Fig. 11 is a fragmentary transverse section taken on the line indicated at 11—11 in Fig. 8; and Fig. 12 is a fragmentary axial section through a pipe joint of the sleeve type showing a gasket of the present invention fitting over the abutting pipe ends and interposed between the pipe ends and an outer sleeve.

Fig. 13 is an axial section through a pipe joint of the bell and spigot type that shows a gasket of the present invention inserted between the bell and the spigot.

Fig. 14 is an axial section through a pipe joint of the bell and spigot type showing the gasket inflated and the action of the gasket in resisting separation of the pipes when the pipes are subjected to axial thrusts tending to pull them apart.

A gasket embodying the invention is shown in Fig. 1 of the accompanying drawings wherein the molded and vulcanized rubber gasket 1 has substantially the form of a cylindrical tube. The gasket 1 is inflatable and has exterior and interior walls 2 and 3 which are cylindrical in shape and which are normally in contact or in substantial contact with each other throughout the width and circumference of the gasket so that the radial thickness of the uninflated gasket is substantially the sum of the thicknesses of the contiguous exterior and interior walls 2 and 3. The walls 2 and 3 are integrally united throughout the side edges of the gasket only, the contiguous inner faces of the walls intermediate the side edges being unconnected so that, on the introduction of fluid under pressure, the gasket may be inflated.

The walls 2 and 3 of the gasket are preferably formed of separate sheets of rubber stock which are vulcanized together only along their edges and for a sufficient distance inwardly from their side edges to provide edge portions 4 which are relatively thick and stiff and which serve to resist lateral bulging of the edges of the gasket on the introduction of fluid under pressure into the gasket. The gasket may be formed of reinforced or unreinforced rubber sheets. Each wall 2 and 3 preferably contains an embedded layer of fabric 5 that extends well into but preferably not through the edge portions 4.

The gasket may be formed by vulcanizing together two strips of sheet rubber in each of which a layer of fabric 5 is embedded. In order to prevent adhesion between the central portions of the strips a strip 6 of adhesion-preventing material, such as Holland cloth, paper, or a coating of adhesion-preventing material such as soapstone is interposed between the rubber strips intermediate the side edges. Upon vulcanization the edge portions are integrally joined, while adhesion between the intermediate portions of the walls is prevented by the strip of non-adhesive material interposed between them.

The fabric 5 may be any suitable reinforcing fabric but it is preferred to employ a fabric which will permit the material of the gasket walls to stretch circumferentially under inflation pressure but will prevent the walls from stretching in a transverse direction when subjected to inflation pressure, thereby preventing axial elongation of the gasket upon inflation, which might cause portions of the gasket to project out beyond the end of the sleeve or bell within which it is mounted and thereby increase the danger of puncture and the danger of rupture of the gasket wall by internal pressure.

As herein shown, the reinforcing fabric is a weftless cord fabric such as used in building cord tires and consisting of parallel unconnected cords embedded in a rubber sheet. The strips of fabric employed in making the gasket are cut transversely of the cords, so that the cords extend transversely across the walls of the gasket.

By reason of the transversely flat construction of the gasket, radial expansion of a side wall tends to draw the edge portions of the gasket inwardly. This is true of the unreinforced gasket as well as of the fabric reinforced gasket. However, a fabric reinforcement which prevents transverse elongation of the walls positively restrains outward movement of the side edges of the gasket and is desirable for the further reason that it permits the use of greater inflation pressures without danger of rupture of the gasket due to such pressures.

The gaskets may be built upon a mandrel 7 as shown in Figs. 4-7, inclusive, of the drawings. The mandrel 7 is removably mounted on a shaft 8 that may be journalled in the head of a standard 9 and driven by a motor 10 that is controlled by a switch 11.

A chuck 12 is mounted upon the shaft 8 and is held against rotation on the shaft by a key 13. The mandrel 7 is mounted upon the outer end of the shaft 8, bears against the outer face of the chuck 12, and is held against turning on the shaft 8 by a pin 14 carried by the chuck, the mandrel 7 being secured against the face of the chuck 12 by a clamping nut 15 which screws upon the shaft 8. The gasket is built on the cylindrical mandrel 7 between a permanent inner flange 16 and an outer flange 17 that is removably held in position by suitable locating means, such as thumb screws 18.

In building the gasket upon the mandrel 7, a strip of rubber stock 19 of a width corresponding to the width of the space between the flanges 16 and 17 as shown in Fig. 4, is used, the length of the strip corresponding to the circumference of the mandrel. The ends of the strip may be cut straight across or upon a bias and the abutting ends are pressed together upon the mandrel to form a smooth joint. Upon the strip 19 covering the cylindrical surface of the mandrel there is then laid a thin strip of non-adhesive material 6 such as paper, Holland cloth or the like as shown in Fig. 4. The strip 6 is narrower than the strip 19 and its edges are spaced equally from the opposite edges of the strip 19 to leave marginal edge portions 20 of the outer face of the strip 19 exposed. A second strip of rubber stock 21 of the same width as the strip 19 is then laid upon the strips 19 and 6 and joined together at its ends in the same manner as the strip 19. The faces of the rubber strips 19 and 21 contact along their marginal edges outwardly of the strip 6 and upon vulcanization the strips of rubber stock are integrally united to form the relatively thick and stiff edge portions of the gasket.

For forming the inflation aperture in the gasket a bolt 22 secured in the fixed flange 16 of the mandrel is provided with an axial opening to receive a wire 23 which is inserted through the bolt far enough to extend over the strip 6 prior to the application of the outer strip of rubber stock. After vulcanization the wire 23 is removed leaving an aperture through the edge wall of the gasket. In order to indicate the location of the inflation aperture, the bolt 22 may be provided with a conical head 24 at its inner end which forms a conical depression in the edge of the gasket.

Another method of making the gasket of the present invention is illustrated in Fig. 8 of the drawings. Any desired number of gaskets may be formed upon an elongated cylindrical mandrel 26. A sheet of rubber 27, cut to a width corresponding to the circumference of the mandrel 26, is wrapped about the mandrel and its edges are joined together to form a tube of rubber upon the mandrel. A series of strips of weftless cord fabric 5, such as used in building automobile tires, are laid on the sheet of rubber 27 and another sheet of rubber placed thereon. Adjacent strips of fabric are spaced axially from each other to provide all rubber edges for each individual gasket. A strip of non-adhesive material 6 is then placed on the exterior surface of the strip of rubber last applied at regularly spaced points along the length thereof. A wire 28 having spaced collars 29 of rubber of a color contrasting with that of the tube is then laid lengthwise on the tube with the rubber collars 29 midway between successive strips of fabric 5 and non-adhesive material 6.

An exterior fabric reinforced wall that corresponds in structure with the interior wall previously described is then built about the exterior of the gasket and the whole tightly wrapped with wet fabric 30 to compress the rubber stock uniformly. The mandrel with the gasket stock thereon is then placed in a vulcanizing heater in which the composite tube is vulcanized under pressure. In the completed tube the strips of fabric and of non-adhesive material are superimposed upon one another at spaced intervals so that by cutting the tube into sections a series of gaskets are formed. After vulcanization the tube is cut into sections along the lines 31—31 in Fig. 8, the wire 28 having first been withdrawn. The sections so cut from the tube form complete gaskets, with very small openings in the side edges which have been formed by the wire 28. The cuts 31 are through the inserts 29 of colored rubber which indicate the position of the hole through which the injection needle may be inserted to inflate the gasket. Discs 32, slidably mounted on the wire 28, may be used to form depressions in the tube edges at the injection needle hole if desired.

Gaskets without fabric reinforcement may be made by substantially similar procedure, except that the cord fabric is omitted. The non-adhesive strips, paper or Holland-cloth, or a coating of non-adhesive material is laid in bands on the tube, the wire is laid lengthwise of the mandrel across the non-adhesive bands, and the outer wall of the gasket is applied.

The gasket, when completed, is in the form of a relatively thin walled cylinder, but by reason of lack of adhesion between the inner and outer layers of rubber stock the gasket has walls which are separable when subjected to internal fluid pressure and the gasket may be expanded to seal the annular space around the joint between pipes or other members.

By reason of the fact that the gasket is molded transversely flat, a cavity of very slight radial depth as compared to its width is formed, which is adapted to be expanded by internal pressure. Since the expansive force of fluid injected into the gasket is exerted in a radial direction upon the inner and outer walls of the gasket, the internal forces due to fluid pressure do not act to expand the gasket laterally and very little strain is placed upon the thickened edge portions of the gasket due to inflation pressure. The thickened edge portions which lie at the open ends of a sleeve or bell also serve to protect the gasket against puncture or against rupture due to internal pressure. The intermediate portions of the gasket walls are confined between rigid surfaces so that the internal pressure merely acts to compress the rubber intermediate the edges of the gasket and to thicken the walls adjacent the side edges.

In Figure 13 of the drawings, the gasket is shown interposed between the bell 33 and the spigot 34 of a pipe joint. The annular space between the bell and spigot need only be sufficient to permit insertion of the transversely flat gasket. Upon inflation of the gasket, the inner and outer walls of the gasket are pressed radially inwardly and outwardly against the external surface of the spigot and the internal surface of the bell and the fluid pressure within the gasket will cause the walls of the gasket to conform to any surface irregularities. If desired, the external surface of the spigot and the internal surface of the bell may be roughened or provided with grooves to increase the frictional resistance to slippage. If desired, closely spaced inner and outer surfaces of the gasket may be roughened or grooved to resist slippage between the gasket and the pipe surface with which the gasket is engaged. Roughened surfaces may be formed on the gasket by the fabric 30 or by fine grooves on the interior surface of an annular mold in which the gasket is vulcanized.

The gasket is inflated with a viscous liquid such as commonly used as a puncture-sealing composition in pneumatic tires. The gasket may be inflated by means of an injection needle (not shown) which may be inserted into the inflation aperture in the edge of the gasket. Liquid may be forced into the gasket through the needle by suitable means, such as a pressure pump or the like. In the absence of the inflation aperture it has been found possible to force the needle through the rubber of the gasket edge with satisfactory results. After withdrawal of the needle the openings receiving the needle will be contracted by the elastic rubber and will be sealed by the viscous liquid. A permanent and positive seal is preferred, however, such as a plug 35 that is forced into the inflation aperture of the gasket edge, the plug 35 being preferably threaded externally so that engagement of the thread with the rubber resists outward movement of the plug.

The gasket of the present invention serves to provide a fluid-tight seal at a pipe joint and also acts to resist relative endwise movements of the pipes. By reason of the elasticity of the rubber, the pressure upon the inner and outer walls of the gasket when placed between inner and outer pipes and inflated, forces the rubber in these walls toward the opposite side edges, reducing the thickness of the central portions of the walls. If the volume of the liquid in the gasket is reduced by reason of a lowering of the temperature, the elastic rubber in the walls of the gasket readjusts itself to compensate for any slight variation in the volume of the liquid, so that an effective pressure is maintained against the opposed pipe surfaces and an effective seal is maintained regardless of variations in temperature.

The gasket also serves to lock the pipe sections together. Fig. 14 of the drawings shows an inflated gasket 1 interposed between the ball 33 and spigot 34. If the pipes be subjected to end thrusts tending to move them apart as indicated by the arrows A and B, the bell 33 will exert an axial thrust upon the outer wall of the gasket due to the frictional engagement between the gasket and bell, causing the same to apply pressure to the inner thickened edge of the gasket and a pull to the outer thickened edge of the gasket. Similarly, the inner wall of the gasket presses upon the outer thickened edge of the gasket and exerts a pull on the inner thickened edge. The inward pull on the outer wall of the gasket and the outward pressure transmitted by the inner wall of the gasket causes the outer thickened edge portion of the gasket to press against the bell 33 as indicated by the arrow C. Similarly, the inner thickened edge portion of the gasket is pressed inwardly against the spigot as indicated by the arrow D. As the thrusts A and B are increased, the thrusts C and D are correspondingly increased, so that the frictional resistance offered by the gasket to separation of the pipe sections increases as the pull tending to separate the sections increases. The gasket of the present invention therefore serves to effectually lock pipe sections together as well as to form a fluidtight seal.

In Fig. 12 of the drawings the gasket is shown applied to a pipe joint of the sleeve type in which the pipes 36 and 37 abut end to end, the gasket fits over the abutting pipe ends, and a sleeve 38 surrounds the gasket. Upon inflation the inner wall of the gasket is pressed radially inwardly against the abutting pipe ends and the external wall of the gasket is pressed radially outwardly against the internal surface of the sleeve.

To disassemble the pipe sections it is only necessary to deflate the gasket which may be readily done by the withdrawal of the plug 12 or by punching a hole in the edge of the gasket. The sealing action of the gasket is unaffected by temperature changes because of the resilience of the inflated rubber gasket. The presence of the gaskets at the joints of a pipe line also imparts an appreciable degree of flexibility to the pipe line and lessens the danger of damage to joints due to relative angular movements of the sections. The gasket may be made in a wide range of sizes and shapes for various purposes and uses, providing an effective seal for joints between sections of glass tubing as well as between sections of metal tubing.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A pipe joint comprising inner and outer pipes and a hollow annular inflatable rubber gasket interposed between said pipes, said gasket having an axially elongated fluid receiving cavity the side edges of which are spaced inwardly from the side edges of the gasket whereby the gasket has an expansible central portion adapted to exert radial pressure against the inner and outer pipes and relatively thick edge portions outwardly of the expansible portion which are engageable with the pipes to resist rolling movements of the gasket and relative endwise movements of the pipes.

2. A gasket for providing a fluid-tight joint in a pipe line, comprising an inner band of rubber adapted to encircle an end of a pipe section, an outer band of rubber overlying the inner band and normally closely adjacent thereto, the marginal portions of the inner band being integrally joined to overlying marginal portions of the outer band to provide relatively thick edge portions and an axially elongated fluid cavity, whereby a fluid introduced between the bands is retained therebetween to distend the gasket, said gasket having reinforcing cords embedded therein, said cords arranged to extend longitudinally of the pipe section to restrict longitudinal extension of the gasket and permit circumferential distortion thereof

HERMAN T. KRAFT.